United States Patent [19]

Nishio et al.

[11] Patent Number: 5,748,159
[45] Date of Patent: May 5, 1998

[54] DISPLAY

[75] Inventors: Takashi Nishio; Chiharu Koshio; Kunimoto Tsuchiya; Tetsuya Matsumoto, all of Yamanashi-ken, Japan

[73] Assignee: Pioneer Electronic Corporation, Tokyo, Japan

[21] Appl. No.: 628,759

[22] Filed: Apr. 5, 1996

[30] Foreign Application Priority Data

Apr. 7, 1995 [JP] Japan .................. 7-082408

[51] Int. Cl.[6] .................................... G09G 3/30
[52] U.S. Cl. ................................ 345/76; 345/55
[58] Field of Search ............. 340/815.83, 815.89; 345/76, 85, 90, 108–111, 55

[56] References Cited

U.S. PATENT DOCUMENTS

| | | | |
|---|---|---|---|
| Re. 31,498 | 1/1984 | Te Velde | 350/269 |
| 4,091,382 | 5/1978 | Anderson et al. | 340/373 |
| 4,182,553 | 1/1980 | Sheridon | 350/336 |
| 4,468,663 | 8/1984 | Kalt | 340/815.27 |
| 4,725,832 | 2/1988 | Lorteije et al. | 340/786 |
| 4,740,785 | 4/1988 | Stroomer et al. | 340/783 |
| 4,786,898 | 11/1988 | Hata et al. | 340/783 |
| 4,794,370 | 12/1988 | Simpson et al. | 340/825 |
| 4,891,635 | 1/1990 | Hata | 340/783 |

*Primary Examiner*—Raymond J. Bayerl
*Assistant Examiner*—Matthew Luu
*Attorney, Agent, or Firm*—Nikaido, Marmelstein, Murray & Oram LLP

[57] ABSTRACT

A plurality of select electrodes and a plurality of address electrodes are provided in matrix. A pixel is provided at each intersection of the select electrode and the address electrode. A mechanical electrostatic switch is provided for connecting the pixel with the select electrode and the address electrode. The electrostatic switch is provided to be operated by electrostatic charge stored between a part of the select electrode and a part of the address electrode.

3 Claims, 6 Drawing Sheets

FIG.5 a
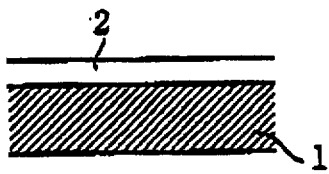
FIG.5 g
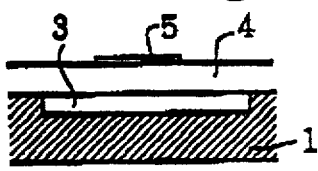
FIG.5 l
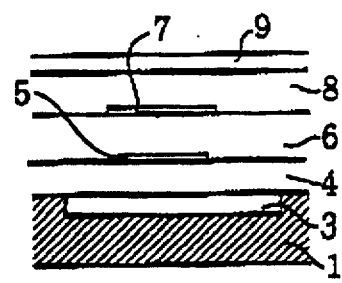
FIG.5 b
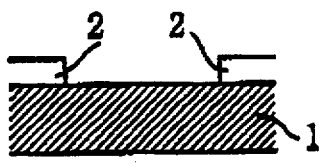
FIG.5 h
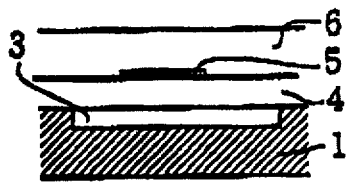
FIG.5 c
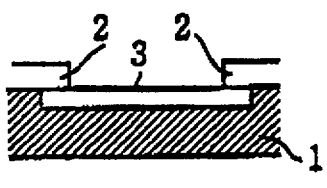
FIG.5 i
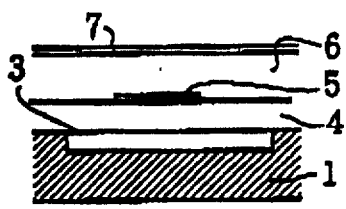
FIG.5 m
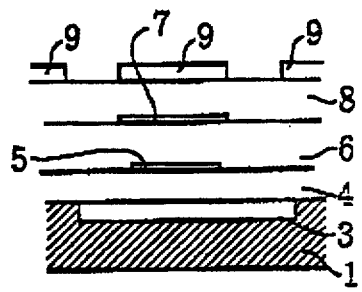
FIG.5 d
FIG.5 j
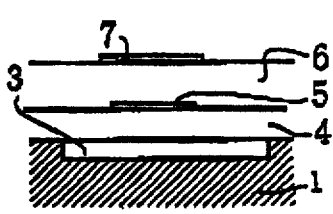
FIG.5 n
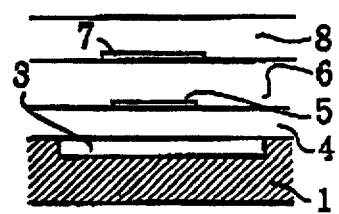
FIG.5 e
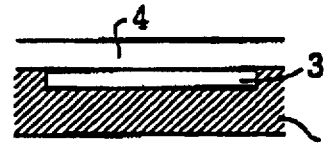
FIG.5 k
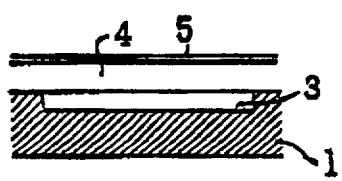
FIG.5 o
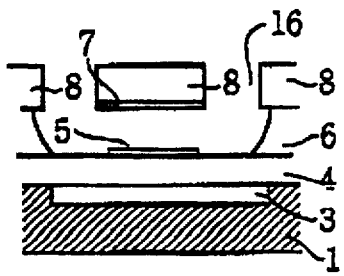
FIG.5 f

DISPLAY

BACKGROUND OF THE INVENTION

The present invention relates to a display having pixels such as electronuminescence elements for showing images on the display panel, and more particularly to a micromechanical electrostatic switch for selectively driving each pixel.

There has been provided a liquid crystal display panel. In order to restrain crosstalk and to achieve a high resolution and a high contrast, the liquid crystal display panel is generally operated in accordance with the active matrix method. In such a display panel, each pixel is provided with an active element such as a thin film transistor which is selectively rendered conductive, thereby to excite the corresponding pixel.

Since the active matrix method requires the use of semiconductor elements such as the thin film transistor for each pixel, it is extremely difficult to manufacture a large display panel. Moreover, the yield is low, so that the manufacturing cost is increased.

SUMMARY OF THE INVENTION

An object of the present invention is to provide a display wherein the image on the display has the same quality as the conventional active matrix display, and which can be easily manufactured at a low cost.

According to the present invention, there is provided a display comprising a plurality of select electrodes as line electrodes, a plurality of address electrodes as column electrodes, a pixel provided at each intersection of the select electrode and the address electrode, and a mechanical electrostatic switch provided for connecting the pixel with the select electrode and the address electrode. The electrostatic switch is provided to be operated by electrostatic charge stored between a part of the select electrode and a part of the address electrode.

The part of the address electrode is formed into a beam. A contact electrode is provided to form a fixed contact of the electrostatic switch, and the beam of the address electrode is attracted by the electrostatic charge, thereby contacting with the contact electrode.

These and other objects and features of the present invention will become more apparent from the following detailed description with reference to the accompanying drawings.

BRIEF DESCRIPTION OF DRAWINGS

FIGS. 5a to 5o are diagrams explaining the manufacturing steps of the display;

DETAILED DESCRIPTION OF THE PREFERRED EMBODIMENT

Figure 1:
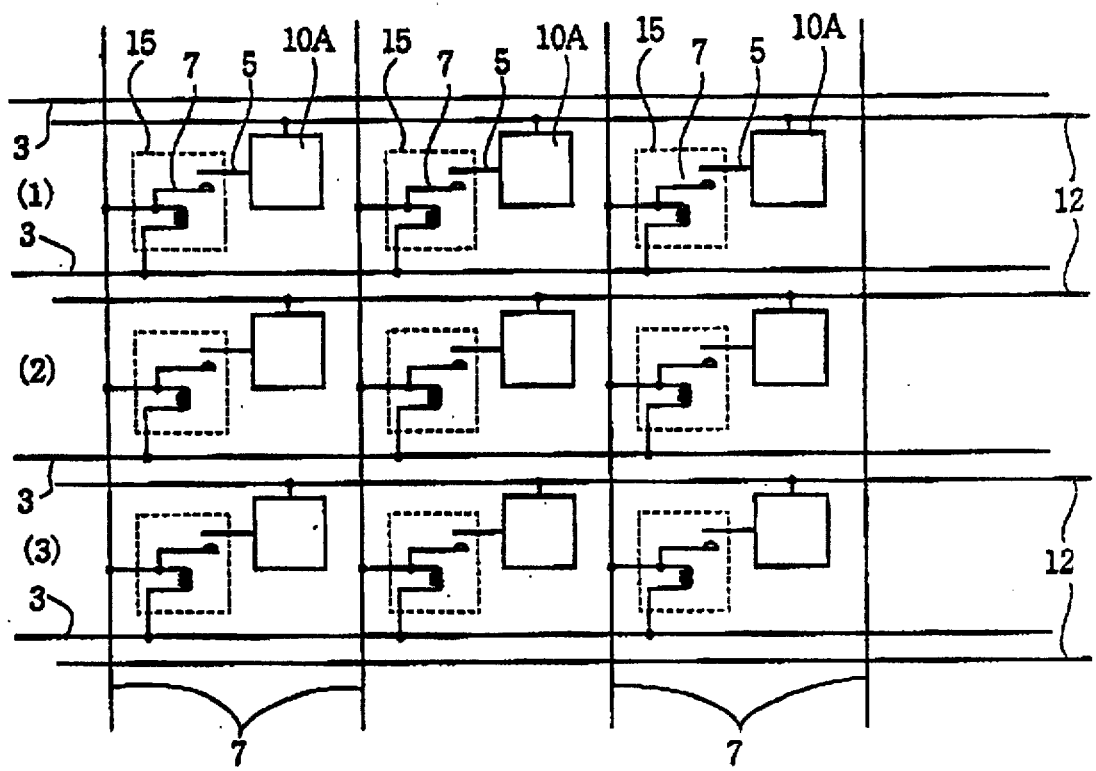
FIG. 1 is a schematic diagram showing an equivalent circuit of a display according to the present invention, provided with electroluminescence pixels.

Referring to FIG. 1, a display according to the present invention comprises a plurality of select electrodes 3 as line electrodes, each select electrode corresponding to one scanning line, and a plurality of address electrodes 7 as column electrodes. At each intersection of the select electrode 3 and the address electrode 7, an electroluminescence (EL) pixel 10A is provided. Each of the EL pixels 10A is operatively connected to the electrodes 3 and 7 through a micromechanical electrostatic switch 15. The pixels 10A in each scanning line are further connected to a common driver electrode 12.

Figure 2:
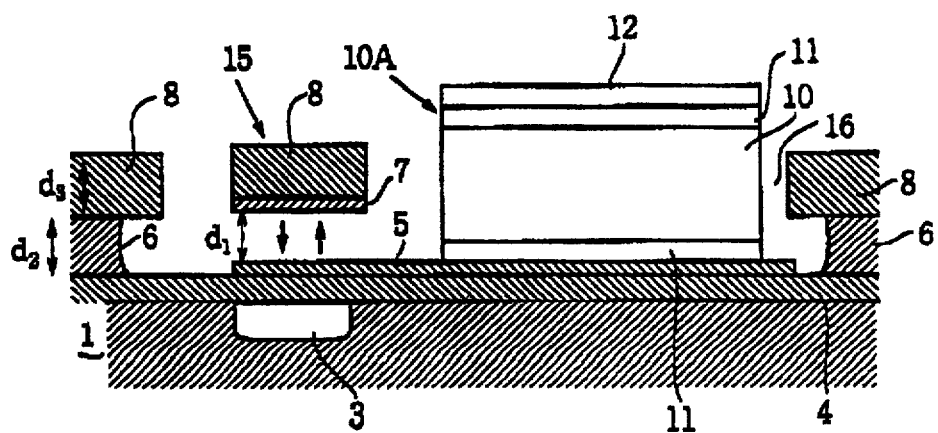
FIG. 2 is a sectional view of the display showing one of the electroluminscence pixels of FIG. 1.

FIG. 2 shows a part of the display showing one of the pixels 10A and the electrostatic switch 15 thereof in detail. The display comprises an N-type silicon substrate 1 made of such materials as single crystal silicon and polysilicon (p-si). On the substrate 1 is formed the select electrodes 3 which are patterned by diffusion or by photolithography of a metal film. The select electrodes 3 are covered by an insulation layer 4 of silicon oxide ($SiO_2$) and having a thickness of 80 nm, formed on the substrate 1.

Further formed on the insulation layer 4 is a lower electrode 5, a non-conductive spacer layer 6 having a thickness $d_2$ of 160 nm. The address electrode 7 is formed on the spacer layer 6. A cover layer 8 having a thickness $d_3$ of 160 nm is formed on the address electrode 7. A plurality of recesses 16 are formed in the spacer layer 6 and the cover layer 8 by the anisotropic dry-etch technique and the isotropic dry-etch technique, so that the lower electrode 5 is exposed therein. The cover layer 8 is adapted to generate a tensile stress so that the material thereof is not drawn down at the edge of the recess 16.

Figure 3:
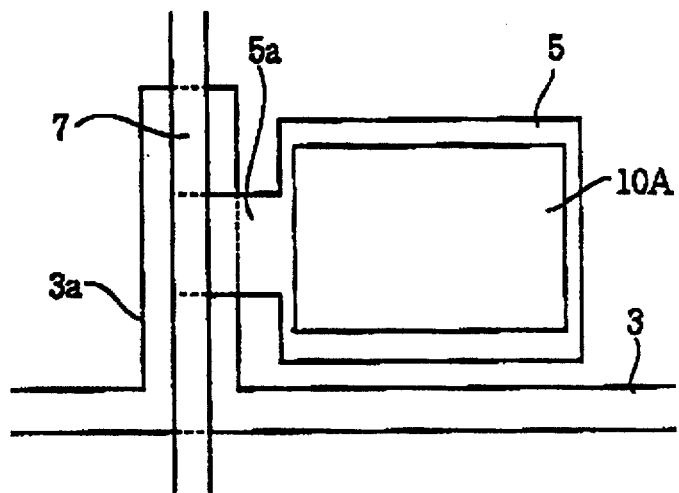
FIG. 3 is a plan view of the pixel of FIG. 2.

As shown in FIG. 3, the select electrode 3 has a branch electrode 3a extending along the address electrode 7. The lower electrode 5 has a projected contact electrode 5a opposite to the address electrode 7, disposed on a portion below the address electrode 7 opposing the select electrode 3 so as not to shut out the electrostatic field between the electrodes 3 and 7 which will be described hereinafter.

Figure 4:
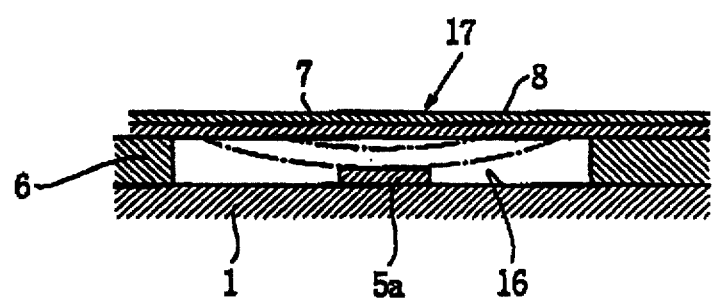
FIG. 4 is a sectional view showing a switch operation.

As shown in FIG. 4, the address electrode 7 and the cover layer 8 overlayed thereon are formed into a bridge or a beam 17 by the recess 16 so as to form the electrostatic switch 15. Referring to FIG. 1, a distance $d_1$ of an electronic gap between the address electrode 7 and the lower electrode 5 is 160 nm. On the lower electrode 5 is mounted the EL pixel 10A, which comprises an EL layer 10 interposed between a pair of insulation layers 11. The driver electrode 12 is formed on the EL pixel 10A.

Figure 6:
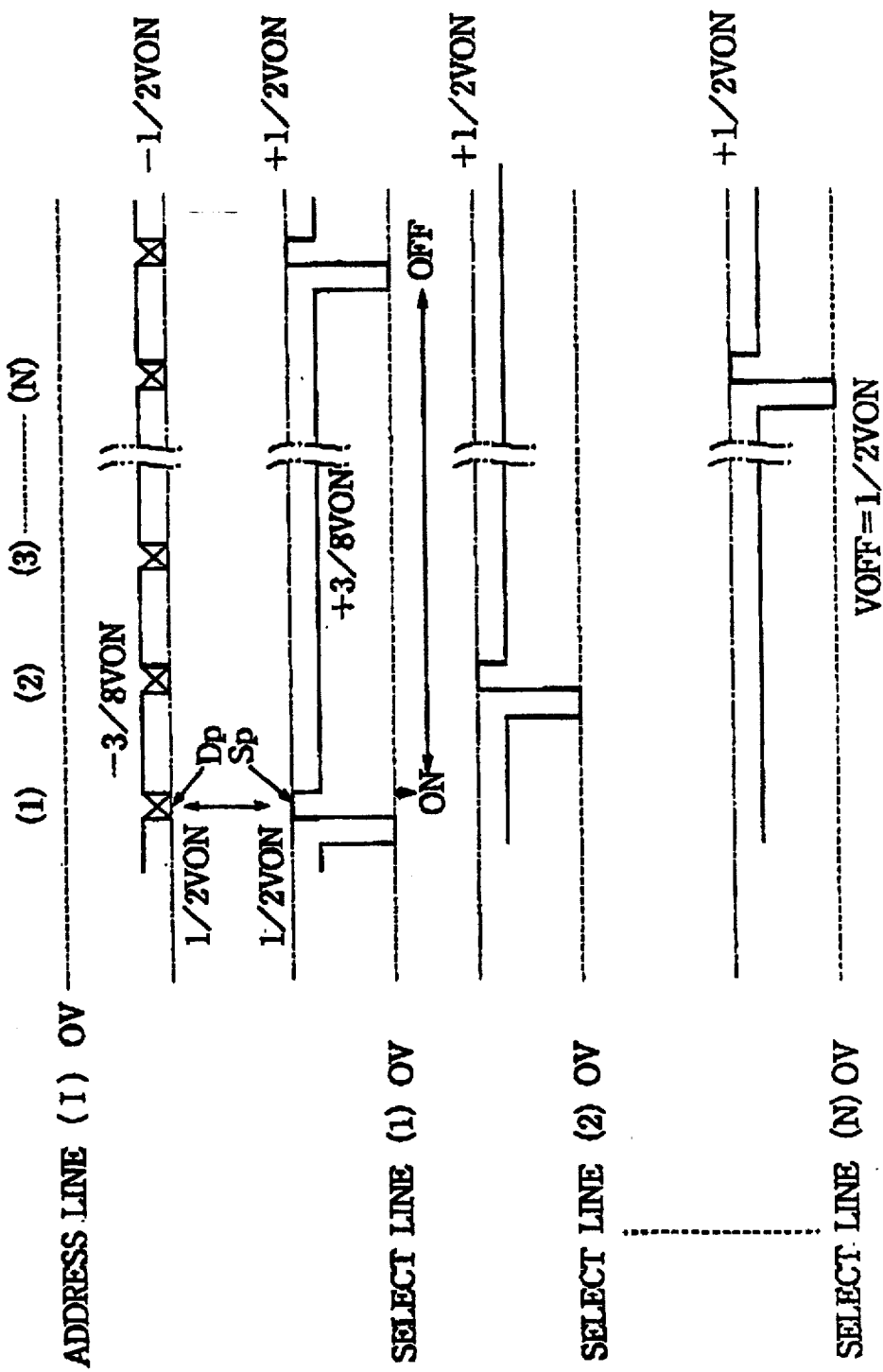
FIG. 6 is a timechart explaining the operation of the display.

The select electrode 3 for each scanning line is applied with a select pulse Sp (FIG. 6) and at the same time, the address electrode 7 is applied with a data pulse Dp (FIG. 6)

for selecting the pixels 10A in the scanning line. In each of the recesses 16 wherein the selected pixels 10A are disposed, electrostatic charge is stored between the address electrode 7 and the select electrode 3. Therefore, the beam 17 composed by the address electrode 7 is attracted to the select electrode 3 by the electrostatic charge, and hence to the lower electrode 5. Thus, the address electrode 7 is contacted with the contact electrode 5a as shown in FIG. 4 by the dot-dash lines. Namely, the electrostatic switch 15 is turned on. Thus, the contact electrode 5a serves as a fixed contact of the electrostatic switch.

Meanwhile, the driving pulses are fed to the selected EL pixels 10A through the driver electrodes 12 in synchronism with the select pulse Sp and the data pulse Dp, so that the pixels 10A are excited to emit light.

Steps for manufacturing the display will now be described hereinafter with reference to FIGS. 5a to 5o. For the ease of explanation, each figure shows only a portion of the display including one pixel.

Referring to FIG. 5a, the N-type silicon substrate 1 of single crystal silicon or of polysilicon, is covered with photoresist to form a mask 2. The mask 2 is patterned as shown in FIG. 5b. A conductive layer is formed on the exposed portions of the substrate 1 so that the select electrode 3 is formed as shown in FIG. 5c. Thereafter, the mask 2 is removed as shown in FIG. 5d. As shown in FIGS. 5e and 5f, there are formed the insulation layer 4 on the substrate 1, and an electrode layer for forming the lower electrode 5 on the insulation layer 4. The electrode layer is further patterned as shown in FIG. 5g, to form the lower electrode 5.

In FIGS. 5h, the spacer layer 6 is mounted on the insulation layer 4 so as to cover the lower electrode 5. An electrode layer is formed on the spacer layer 6 and patterned to form the address electrode 7 as shown in FIGS. 5i and 5j. The cover layer 8 is further mounted on the spacer layer 6 as shown in FIG. 5k to cover the address electrode.

A photoresist layer 9 is further formed on the cover layer 8 as shown in FIG. 5l, and patterned in accordance with the position and the shape of the recess 16 in FIG. 5m. The anisotropic dry-etch technique is used to form the recess 16 in the cover layer 8 as shown in FIG. 5n. The recess 16 is further formed, in the spacer layer 6 as shown in FIG. 5o by the isotropic dry-etch technique, so that the lower electrode 5 on the insulation layer 4 is exposed.

The operation of the display is described hereinafter with reference to FIGS. 6 and 7. Through out the description, a voltage Von represents a voltage required to close the electrostatic switch 15, and a voltage Voff represents a voltage at which the switch is opened and which is about one half of the voltage Von.

Referring FIGS. 1 and 6, first of all, the select electrode 3 of a select line (1) corresponding to the first scanning line, is fed in synchronism with a horizontal synchronizing signal, with the select pulse Sp having a voltage of +½Von. The data pulse Dp having a voltage of -½Von is simultaneously fed to the address electrodes 7 for selecting the EL pixels 10A in the select line (1) which are to emit light. Since electrostatic charge is generated between the address electrodes 7 and the select electrode 3 in each of the recesses 16 wherein the selected pixel 10A is disposed, the beams 17 formed by the address electrodes 7 and the cover layer 8 are attracted to the select electrode 3. Therefore, the address electrodes 7 are contacted with the contact electrodes 5a as described above, thereby turning on the electrostatic switches 15 of the selected pixels 10A in the first select line (1). The driving pulse is accordingly applied to the selected pixels 10A through the driver electrode 12 of the first select line (1), so that the selected pixels 10A emit light.

Figure 7:
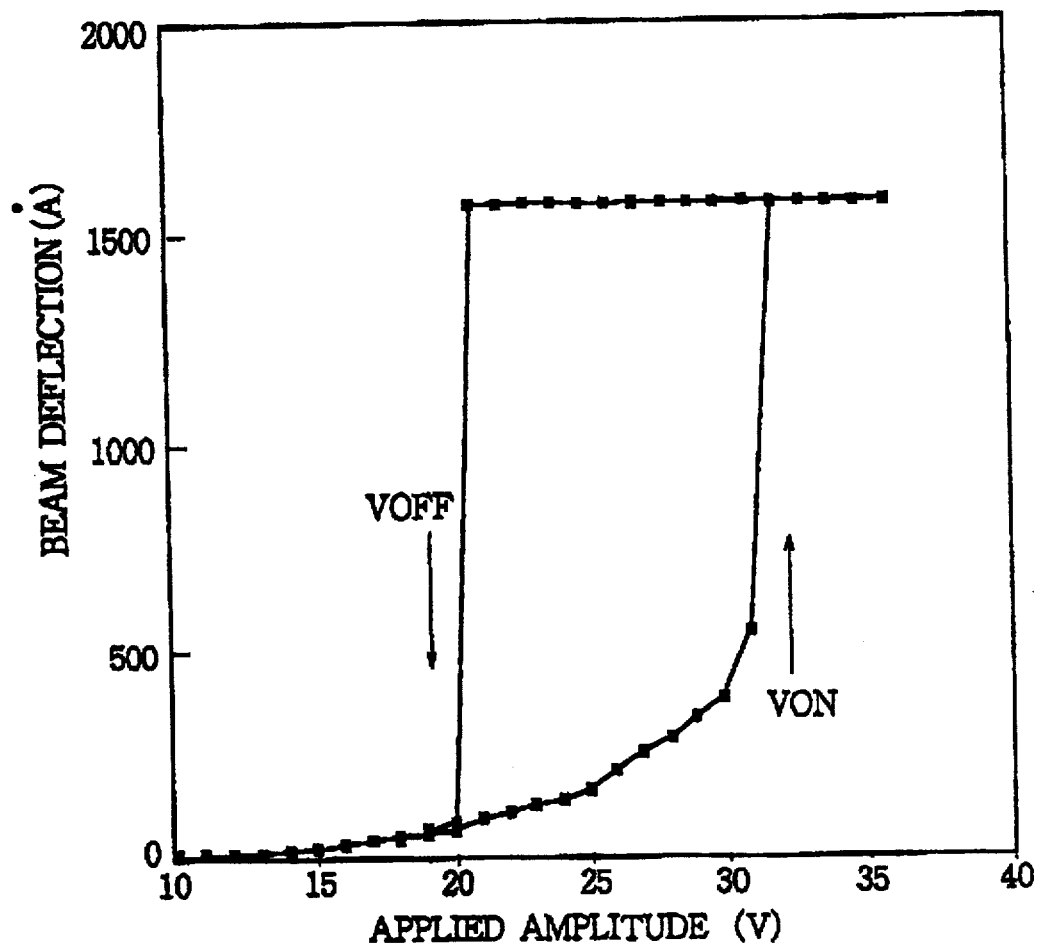
FIG. 7 is a graph showing a hysteresis characteristic of switching elements provided in the display of FIG. 1.

Each electrostatic switch 15 has a hysteresis characteristic as shown in FIG. 7 which shows the relationship between the amplitudes of voltage applied to the select electrode 3 and the address electrode 7, and quantities of the deflection of the beam 17. As shown in FIG. 7, when the applied amplitude is increased to about 32 volts, the bean 17 is deflected about 1600 angstrom, thereby closing the switch 15. Although the voltage gradually decreases, the deflection of the beam 17 is maintained the same until the voltage decreases to about 22 volts, whereby the beam 17 is retracted so that the electrostatic switch 15 is opened. The hysteresis of the electrostatic switch 15 has a width of about 10 volts. The reason why the switch 15 has a wide hysteresis width is that the switch is operated by the mechanical deflection of the member.

The electrostatic switch 15 is adapted to close when the potential difference of pulses applied to the select electrode 3 and the address electrode 7 is |Von| and to open when the potential difference is |½Von|≈ Voff|. In order to maintain the emission of the selected pixels 10a after they are once lighted, the electrostatic switches 15 are closed by keeping the potential difference at |¾Von| which is smaller than the difference |Von|. Hence the select electrode 3 is applied with a voltage of +⅜Von while the address electrodes 7 are applied with a voltage of -⅜Von as shown in FIG. 6.

It is further determined which of the EL pixels 10A in select lines (2) to (N) are to emit light one line at a time. The selected pixels 10A in each line emit and keep on emitting light in the hereinbefore described manner. When the last select line (N) is scanned, one picture frame is completed. When the potential difference of the voltages applied to the select electrodes and the address electrodes 7 becomes smaller than |½Von|, the emission of light of all of the EL pixels 10A is stopped. Namely, as shown in FIG. 6, in the select line (1), for example, the emission of light of the pixels 10A are held during the period shown by an arrow extended between points indicated ON and OFF.

As described above, the electrostatic switch 15 of the present invention has a wide hysteresis width, (in other words the difference between the voltage Von and Voff). Therefore, the EL pixels 10A operated by electrostatic switches can easily maintain the light emitting state (memory function). Moreover, the margin of a driving voltage (¾Von) by which the pixels are kept operative can be largely increased.

Since the electrostatic switch 15 is mechanically operated, an impedance ratio between the conductive state of the address electrode 7 with the lower electrode 5 and the in conductive state thereof is large. Hence crosstalk can be reliably prevented. Moreover, the contrast of the images on the display is improved and the power consumption is decreased.

Figure 8:
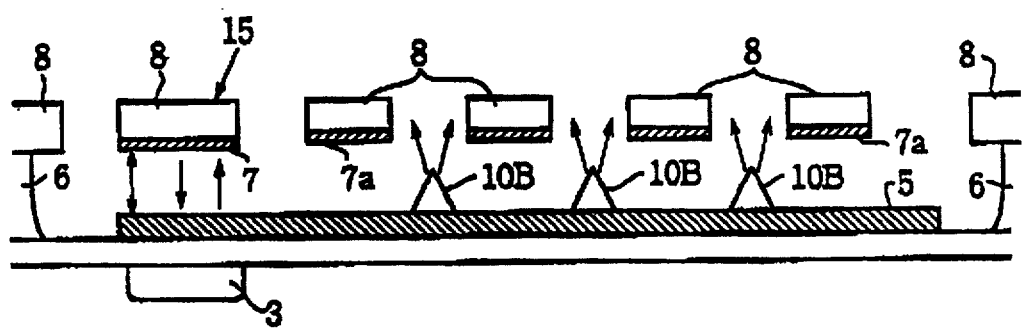
FIG. 8 is a sectional view showing another embodiment of the display wherein field emission device pixels are provided.
Figure 9:
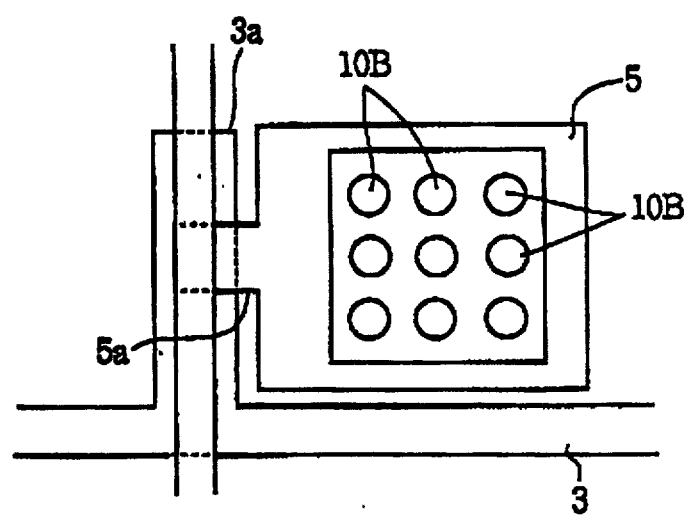
FIG. 9 is a plan view showing one of the pixels of FIG. 8.

Referring to FIGS. 8 and 9, the present invention may be applied to a display having, as pixels, field emission devices (FEDs) 10B wherein fluorescent material (not shown) is lighted. Each address electrode 7 has a plurality of gate electrodes 7a. When the address electrode 7 and the lower electrode 5 are applied with voltage, an electric field is formed between the gate electrodes 7a and the lower electrode 5. The FEDs 10B accordingly discharge electrons so that the fluorescent material provided therein emits light.

According to the display of the present invention, a micromechanical electrostatic switch having a wide hysteresis characteristic is provided for each pixel. Since the switches are selectively operated, crosstalk can be restrained and the resolution and the contrast of the images on the display can be improved, further rendering it possible to provide a display having same image quality as the conventional active matrix display. Moreover, the electrostatic switches can be easily, produced by pattering process. Thus the manufacture of the display is facilitated and the cost thereof decreased.

While the invention has been described in conjunction with preferred specific embodiment thereof, it will be understood that this description is intended to illustrate and not limit the scope of the invention, which is defined by the following claims.

What is claimed is:

1. A display comprising:

a plurality of select electrodes as line electrodes;

a plurality of address electrodes as column electrodes;

a pixel provided at each intersection of the select electrode and the address electrode;

a mechanical electrostatic switch provided for connecting the pixel with the select electrode and the address electrode;

the electrostatic switch being provided to be operated by electrostatic charge stored between a part of the select electrode and a part of the address electrode;

said part of the address electrode being formed into a beam.

2. The display, according to claim 1 further comprising a contact electrode to form a fixed contact of the electrostatic switch.

3. The display according to claim 1 wherein the beam of the address electrode is attracted by the electrostatic charge, thereby contacting with the contact electrode.

* * * * *